US012531942B2

(12) United States Patent
Choi et al.

(10) Patent No.: US 12,531,942 B2
(45) Date of Patent: Jan. 20, 2026

(54) ELECTRONIC DEVICE AND OPERATING METHOD THEREOF

(71) Applicant: Samsung Electronics Co., Ltd., Suwon-si (KR)

(72) Inventors: Byunggun Choi, Suwon-si (KR); Younseob Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 18/477,803

(22) Filed: Sep. 29, 2023

(65) Prior Publication Data

US 2024/0121333 A1    Apr. 11, 2024

Related U.S. Application Data

(63) Continuation of application No. PCT/KR2023/014757, filed on Sep. 26, 2023.

(30) Foreign Application Priority Data

Oct. 11, 2022  (KR) .......................... 10-2022-0129475
Nov. 21, 2022  (KR) .......................... 10-2022-0156496

(51) Int. Cl.
*H04M 1/00* (2006.01)
*G10L 15/02* (2006.01)
(Continued)

(52) U.S. Cl.
CPC .......... *H04M 1/6041* (2013.01); *G10L 15/02* (2013.01); *G10L 19/005* (2013.01);
(Continued)

(58) Field of Classification Search
CPC .......... H04M 1/6041; H04M 1/72454; H04M 1/6066; H04M 2250/74; G10L 15/02;
(Continued)

(56) References Cited

U.S. PATENT DOCUMENTS 7,397,926 B1   7/2008  Frerking
7,773,943 B2   8/2010  Zurek et al.
(Continued)

FOREIGN PATENT DOCUMENTS

KR   960020075 A   6/1996
KR   100733037 B1  6/2007
(Continued)

OTHER PUBLICATIONS

Search Report and Written Opinion dated Jan. 10, 2024 issued in International Patent Application No. PCT/KR2023/014757.

*Primary Examiner* — Md K Talukder
(74) *Attorney, Agent, or Firm* — Nixon & Vanderhye, P.C.

(57) ABSTRACT

An electronic device according to an embodiment of the disclosure includes: a microphone, a communication module including a first communication circuit configured to provide a call channel with a first external electronic device and a second communication circuit configured to provide a communication channel with a second external electronic device, a processor electrically connected with the communication module. The processor is configured to: allow the electronic device operating in a first transmission mode and the first external electronic device to establish a call connection with each other through the first communication circuit, identify whether there is an utterance of a user wearing the second external electronic device, while the call connection is maintained, and operate in a second transmission mode different from the first transmission mode, based on a voice signal of the user to be transmitted to the first external electronic device not being recognized, while the call connection is maintained, and operate in the first transmission mode, based on the voice signal of the user to be
(Continued)

transmitted to the first external electronic device being recognized, while the call connection is maintained.

20 Claims, 11 Drawing Sheets

(51) Int. Cl.
    *G10L 19/005*     (2013.01)
    *G10L 19/012*     (2013.01)
    *G10L 25/78*     (2013.01)
    *H04M 1/60*     (2006.01)
    *H04R 25/00*     (2006.01)

(52) U.S. Cl.
    CPC ............ *G10L 19/012* (2013.01); *G10L 25/78* (2013.01); *H04R 25/554* (2013.01)

(58) Field of Classification Search
    CPC ..... G10L 19/005; G10L 19/012; G10L 25/78; H04R 25/554; H04R 1/1041; H04R 2205/041; H04R 2201/107; H04R 2225/49
    See application file for complete search history.

(56) References Cited

U.S. PATENT DOCUMENTS

| | | | |
|---|---|---|---|
| 7,869,612 | B1 | 1/2011 | Frerking |
| 8,509,466 | B2 | 8/2013 | Frerking |
| 8,670,355 | B1 | 3/2014 | Frerking et al. |
| 9,408,162 | B2 | 8/2016 | Ho et al. |
| 9,544,406 | B2 | 1/2017 | Gautier et al. |
| 9,554,220 | B2 | 1/2017 | Frerking et al. |
| 9,843,667 | B2 | 12/2017 | Kim et al. |
| 10,085,180 | B2 | 9/2018 | Park et al. |
| 11,195,518 | B2 | 12/2021 | Roeck |
| 2007/0116308 | A1 | 5/2007 | Zurek et al. |
| 2011/0201393 | A1 | 8/2011 | Gautier et al. |
| 2017/0149961 | A1 | 5/2017 | Kim et al. |
| 2017/0238214 | A1 | 8/2017 | Park et al. |
| 2020/0312303 | A1 | 10/2020 | Roeck |
| 2021/0385893 | A1* | 12/2021 | Jin ........................ H04W 76/15 |
| 2022/0051660 | A1 | 2/2022 | Roeck |
| 2022/0189477 | A1* | 6/2022 | Shin ........................ H03G 3/32 |
| 2022/0222036 | A1* | 7/2022 | Kim ........................ H04R 3/005 |
| 2022/0225449 | A1* | 7/2022 | Son ........................ H04R 3/00 |
| 2024/0121333 | A1* | 4/2024 | Choi ........................ G10L 15/02 |

FOREIGN PATENT DOCUMENTS

| | | |
|---|---|---|
| KR | 10-2009-0010506 | 1/2009 |
| KR | 20130069834 A | 6/2013 |
| KR | 10-2017-0060782 | 6/2017 |
| KR | 10-2017-0096445 | 8/2017 |
| KR | 10-2022-0118196 | 8/2022 |

* cited by examiner

ELECTRONIC DEVICE AND OPERATING METHOD THEREOF

CROSS-REFERENCE TO RELATED APPLICATIONS

This application is a continuation of International Application No. PCT/KR2023/014757 designating the United States, filed on Sep. 26, 2023, in the Korean Intellectual Property Receiving Office and claiming priority to Korean Patent Application Nos. 10-2022-0129475, filed on Oct. 11, 2022, and 10-2022-0156496, filed on Nov. 21, 2022, in the Korean Intellectual Property Office, the disclosures of each of which are incorporated by reference herein in their entireties.

BACKGROUND

Field

The disclosure relates to an electronic device and an operating method thereof.

Description of Related Art

Recently, electronic devices have been developed in various forms for convenience of users and have provided various services or functions. There is a function to provide hearing impaired users with the best call sound quality among pieces of information according to the execution of the various services or functions of the electronic devices.

SUMMARY

According to an example embodiment of the disclosure, an electronic device is provided. The electronic device may include: a microphone, a communication module including a first communication circuit configured to provide a call channel with a first external electronic device and a second communication circuit configured to provide a communication channel with a second external electronic device, and a processor electrically connected with the communication module. The processor may be configured to: allow the electronic device operating in a first transmission mode and the first external electronic device to establish a call connection with each other through the first communication circuit, identify whether there is an utterance of a user who wears the second external electronic device while the call connection is maintained, and operate in a second transmission mode different from the first transmission mode, based on a voice signal of the user to be transmitted to the first external electronic device not being recognized, while the call connection is maintained, and operate in the first transmission mode, based on the voice signal of the user to be transmitted to the first external electronic device being recognized, while the call connection is maintained.

According to an example embodiment of the disclosure, a method of operating an electronic device is provided. The method may include: providing a communication channel with a first external electronic device in a first transmission mode and providing a communication channel with a second external electronic device, identifying whether there is an utterance of a user who wears the second external electronic device while a call connection between the electronic device and the first external electronic device is maintained, operating in a second transmission mode different from the first transmission mode, based on a voice signal of the user to be transmitted to the first external electronic device not being recognized, while the call connection is maintained, and operating in the first transmission mode, based on the voice signal of the user to be transmitted to the first external electronic device being recognized, while the call connection is maintained.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar denotations may be used for the same or similar components.

DETAILED DESCRIPTION

Below, various example embodiments of the present disclosure may be described with reference to accompanying drawings. Accordingly, those of ordinary skill in the art will recognize that various modifications, equivalents, and/or alternatives on the various example embodiments described herein can be variously made without departing from the scope and spirit of the present disclosure.

Figure 1:
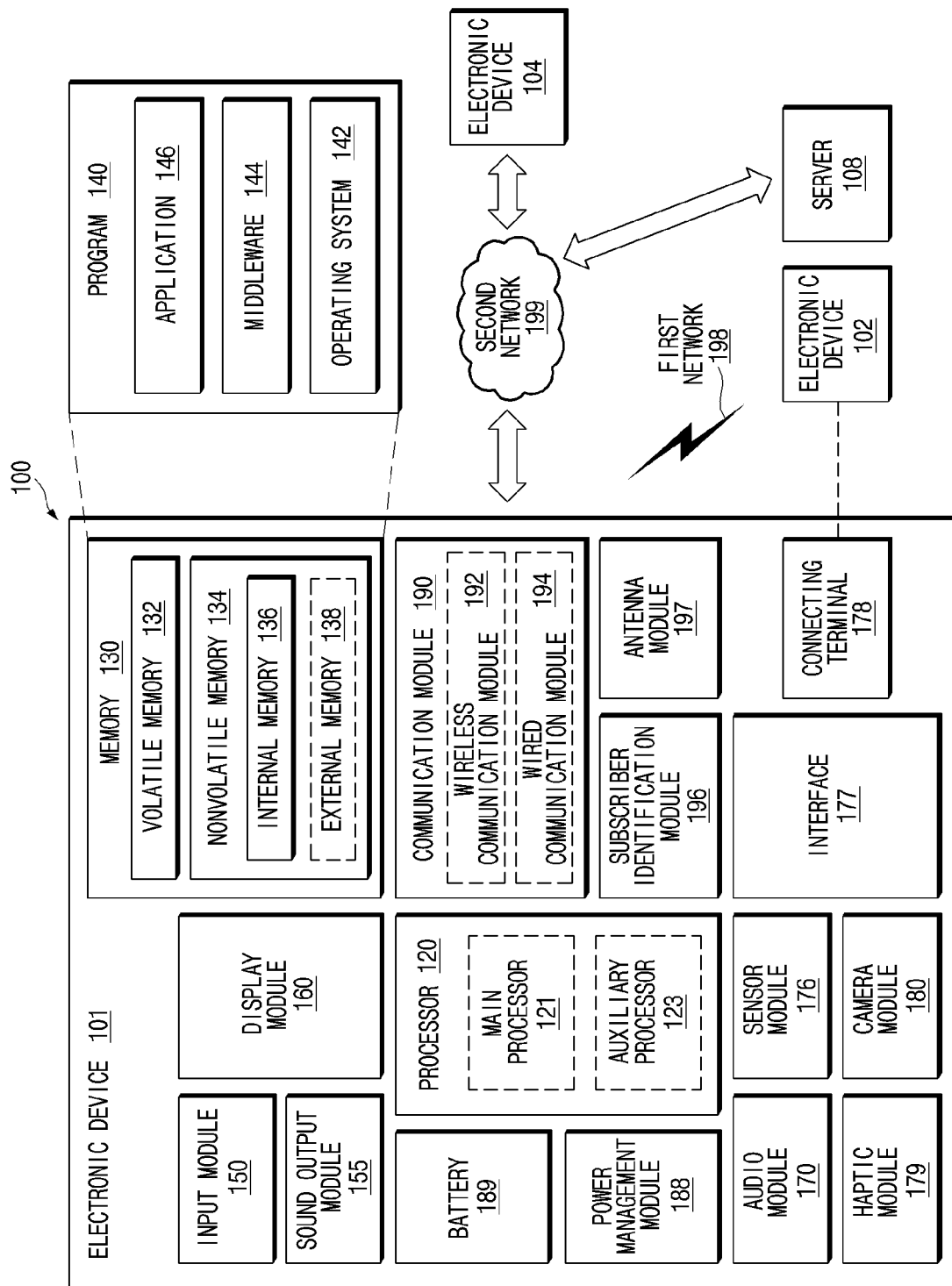
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
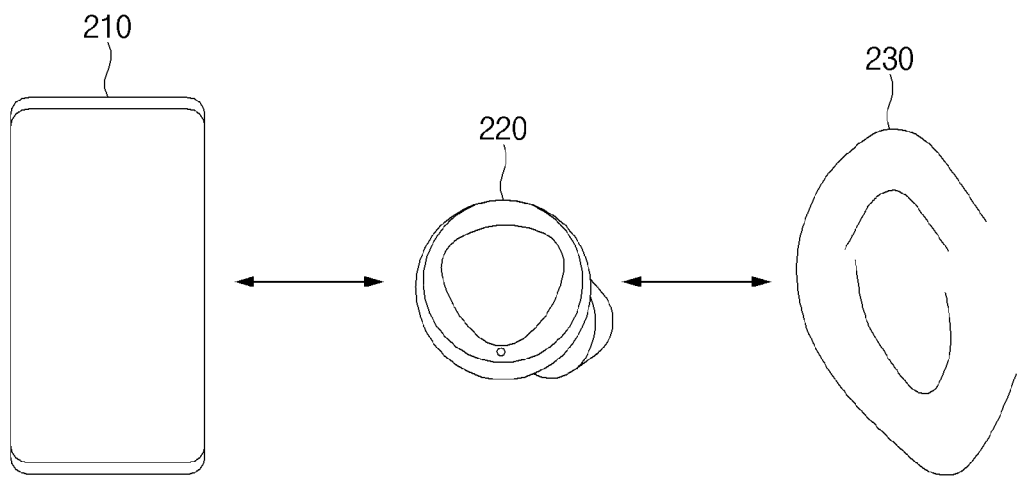
FIG. 2 is a diagram illustrating an example of using electronic devices according to various embodiments.

FIG. 2 is a diagram illustrating an example of using electronic devices according to various embodiments.

Referring to FIG. 2, an audio device 220 may include a microphone, a speaker, and an amplifier. For example, the audio device 220 may receive an external audio through the microphone and may perform signal processing (e.g., filter application or signal amplification) of the received audio to output it through the speaker. The audio device 220 may be a wearable device capable of being worn on at least a part of a wearer's (or user's) body 230 (e.g., the ear). For example, the audio device 220 may be worn near the inside or outside of the ear of the wearer to output a sound near of the ear of the user through the speaker. When an electronic device 210 connects a call with a counterpart device (e.g., an external electronic device 102 or 104 of FIG. 1) (or a first external electronic device), the audio device 220 (e.g., the external electronic device 102 or 104 of FIG. 1) (or a second external electronic device) may provide the wearer with a call function through the microphone and the speaker. The audio device 220 may have various forms depending on a user's purpose of use and may provide various functions. The audio device 220 may include a headset, a headphone, an earpiece, hearing aids, or personal sound amplification products. For example, the audio device 220 may be hearing aids which are mounted on the ears of the user to amplify a sound. The hearing aids may operate to suit hearing for each frequency, which is hearing loss. The hearing aids may convert and output the voice, received from the electronic device 210 which provides the call function, into a signal of a specific frequency band. The hearing aids may have a receiver including a tele-coil or a T-coil.

The electronic device 210 (e.g., an electronic device 101 of FIG. 1) of a user who wears the audio device 220 may provide various functions. For example, the electronic device 210 may provide a call function (e.g., a voice call, a video call, an Internet call, or the like), a content playback function (e.g., music playback, video playback, or the like), a data transmission and reception function, and the like.

The electronic device 210 may provide a hearing aid compatibility (HAC) mode. As an example, when an item for activating the HAC mode in a setting menu of the electronic device 210 is selected, the electronic device 210 may activate the HAC mode. As another example, when detecting a predetermined (e.g., specified) gesture, the electronic device 210 may activate the HAC mode. As another example, when there is the audio device 220 in a short distance from the electronic device 210 (or when the electronic device 210 and the audio device 220 are in contact with each other), the electronic device 210 may activate the HAC mode. As another example, when a communication connection (e.g., a call connection) between the electronic device 210 and a counterpart device (e.g., the electronic device 102 or 104 of FIG. 4) is established, the electronic device 210 may automatically activate the HAC mode.

The electronic device 210 may meet regulations according to HAC T-coil specs, thus supporting the HAC mode. The HAC T-coil specs may be determined as a difference (e.g., signal to noise ratio (SNR)) between a voice signal (audio band magnetic 1 (ABM1)) which is output through the speaker of the electronic device 210 and is necessary for hearing aids and an unnecessary magnetic signal (audio band magnetic 2 (ABM2)) in a state where a voice signal output from the speaker of the electronic device 210 is not applied. For example, target ABM1 may be measured in the directions of an X-axis which is a longitudinal direction of the electronic device 210, a Y-axis which is a width direction of the electronic device 210, and a Z-axis which is a thickness direction of the electronic device 210, at a specific location of the electronic device 210. Unnecessary ABM2 may be measured in the directions of the X-axis, the Y-axis, and the Z-axis at the same location as the target ABM1.

The electronic device 210 may reduce magnetic field noise induced to the audio device 220 to meet HAC regulations. Herein, the flow of a signal generated by an radio frequency (RF) operation of the electronic device 210 may act as magnetic field noise in hearing aids used by the wearer. In a call reception interval to listen to an audio signal from the counterpart device without a voice of the user during a call, the electronic device 210 according to an embodiment may minimize and/or reduce magnetic field noise generated by the electronic device 210 to meet the HAC regulations.

According to an embodiment, at least any one of the audio device 220 and the electronic device 210 may provide a hearing correction function. As an example, the audio device 220 and the electronic device 210 may correct data for a sound received from the outside or internally played audio data. As another example, the audio device 220 or the electronic device 210 may correct data to be suitable for an auditory characteristic of the user using auditory data of the user. For example, the auditory data may include pieces of information about the amount of noise attenuation, a filter value, a pass frequency, a cutoff frequency, a sound amplification value, directionality, a fitting parameter for each user, and the like corresponding to the auditory characteristic of the user. As another example, the audio device 220 and the electronic device 210 may correct different pieces of data. For example, the audio device 220 may correct data for a sound received from the outside, and the electronic device 210 may correct internally played audio data. For example, the internally played audio data may include audio data when a voice or content (audio content or video content) is played or voice data when the call is made.

According to an embodiment, the audio device 220 may be connected with the electronic device 210. For example, the audio device 220 and the electronic device 210 may be connected wired or wirelessly with each other to communicate with each other. The audio device 220 and the electronic device 210 may share data through communication. As an example, the audio device 220 and the electronic device 210 may transmit and receive data for a sound or audio data through communication. As another example, the audio device 220 and the electronic device 210 may transmit and receive data in which the data for the sound is corrected or data in which the audio data is corrected.

Figure 3:
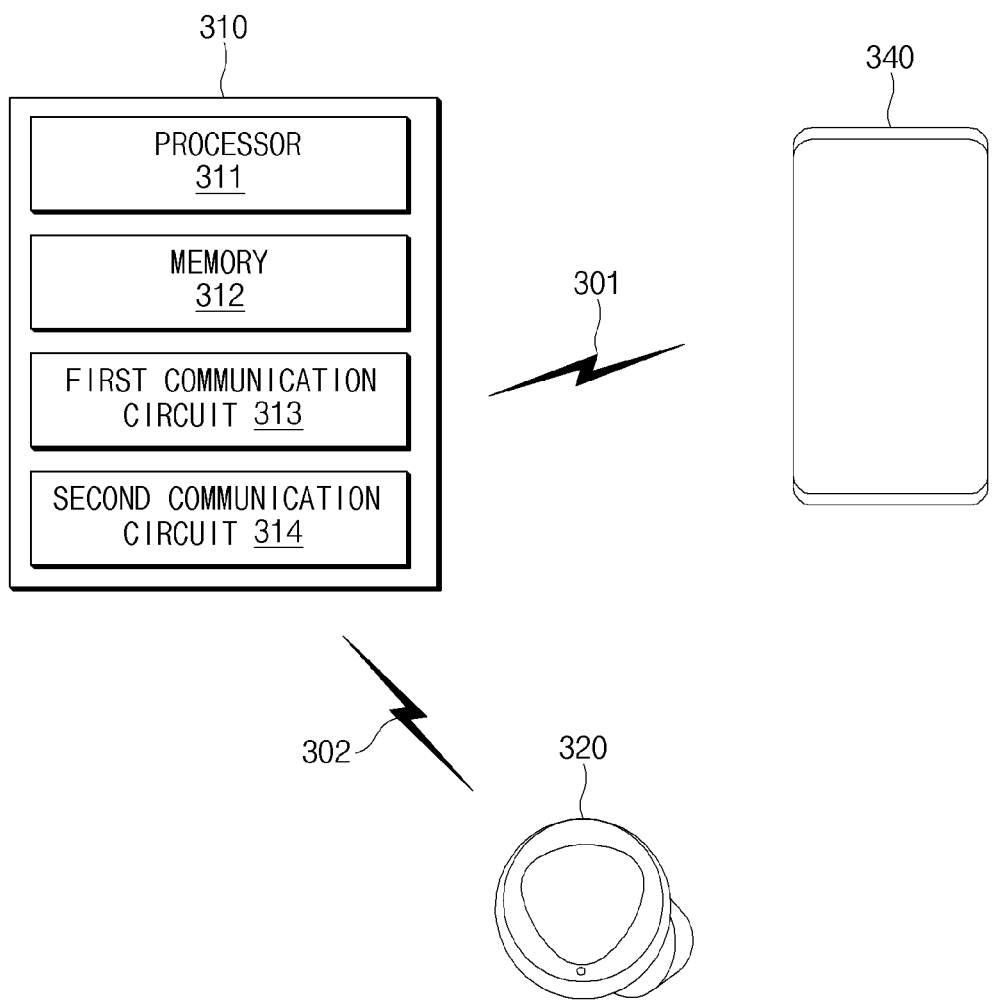
FIG. 3 is a diagram illustrating a communication environment among an electronic device of a user, an audio device of a user, and a counterpart device according to various embodiments.

FIG. 3 is a diagram illustrating an example communication environment among an electronic device of a user, an audio device of a user, and a counterpart device according to various embodiments.

Referring to FIG. 3, at least a part of an electronic device 310 (e.g., an electronic device 101 of FIG. 1) of a user who wears an audio device 320 and a counterpart device 340 (e.g., an external electronic device 102 or 104 of FIG. 1) may include the same or similar configuration to the electronic device 101 shown in FIG. 1 and may use the same or similar function to the electronic device 101.

The electronic device 310 of the user may include a processor (e.g., including processing circuitry) 311, a memory 312, and first and second wireless communication circuits 313 and 314. According to an embodiment, the processor 311 may be substantially the same as a processor 120 of FIG. 1 or may be included in the processor 120. The memory 312 may be substantially the same as a memory 130 of FIG. 1 or may be included in the memory 130. The wireless communication circuits 313 or 314 may be substantially the same as a communication module 192 of FIG. 1 or may be included in the wireless communication module 192.

The processor 311 may be operatively connected with at least any one of the wireless communication circuits 313 and 314 and the memory 312. The processor 311 may include an application processor (AP) (e.g., a main processor 121 of FIG. 1) and/or a communication processor (CP) (e.g., an auxiliary processor 123 of FIG. 1, an audio processor 410 of FIG. 4, and a communication processor 420 of FIG. 4).

The memory 312 may store various pieces of data used by at least one component (e.g. the processor 311 or the wireless communication circuit 313 or 314) of the electronic device 310. The memory 312 may store various instructions executable by the processor 311.

The wireless communication circuits 313 and 314 may receive a signal from the counterpart device 340 through a plurality of antennas (not shown) and/or may transmit a signal to the counterpart device 340 and the audio device 320. The wireless communication circuits 313 and 314 may include the first communication circuit 313 and the second communication circuit 314. The first communication circuit 313 and the second communication circuit 314 may include different circuits or different pieces of hardware. The first communication circuit 313 and the second communication circuit 314 may be parts which are divided logically (e.g., in software).

The first communication circuit 313 may form a first link (or a first communication channel) 301 with the counterpart device 340. The first communication circuit 313 may be a long-range communication circuit for a call connection with the counterpart device 340. For example, the first communication circuit 313 may support long-range communication such as a legacy cellular network, a 5G network, a next-generation cellular network, the Internet, or a computer network (e.g., a LAN or a WAN).

The second communication circuit 314 may form a second link (or a second communication channel) with the audio device 320. The second communication circuit 314 may be a short-range communication circuit for transmitting and receiving a voice signal with the audio device 320. The second communication circuit 314 may support short-range communication such as Bluetooth, wireless fidelity (WiFi) direct, or infrared data association (IrDA).

According to an embodiment, the electronic device 310 may create or establish the first link 301 with the counterpart device 340 through the first communication circuit 313. The electronic device 310 and the counterpart device 340 may transmit and receive a data packet through the first link 301. The electronic device 310 may transmit a data packet including content such as text, an audio, an image, or a video to the counterpart device 340. The electronic device 310 may create the first link 301 with the counterpart device 340 based on a communication protocol. The electronic device 310 may create the first link 301 based on a synchronous connection protocol or an asynchronous connection protocol. For example, the synchronous connection protocol may include a protocol supporting to exchange audio data in real time (e.g., a protocol supporting a hands-free profile (HFP)). The asynchronous connection protocol may include a protocol (e.g., an advanced audio distribution profile (A2DP) or a serial port profile (SPP)) using an asynchronous connection-less (ACL) protocol.

The electronic device 310 may create or establish a second link 302 with the audio device 320 through the second communication circuit 314. For example, the electronic device 310 may create the second link 302 with the audio device 320 based on the communication protocol. The electronic device 310 may create the second link 302 based on the synchronous connection protocol or the asynchronous connection protocol.

According to an embodiment, in the second link 302, the electronic device 310 may serve as a central device and the audio device 320 may serve as a peripheral device.

According to an embodiment, the electronic device 310 may transmit a data packet including voice content such as an audio or a video to the audio device 320. When the electronic device 310 transmits the data packet, the electronic device 310 may be referred to as a source device and the audio device 320 may be referred to as a sink device.

According to an embodiment, the electronic device 310 may operate in any one of a first transmission mode (or a call transmission mode) and a second transmission mode (or a call reception mode) depending on whether there is a voice of the user to be transmitted to the counterpart device 340.

The first transmission mode may be executed when there is a voice of the user to be transmitted to the counterpart device 340 in the state where the call channel is formed with the counterpart device 340. In other words, the first transmission mode may be a mode for transmitting data including a transmission voice of the user to the counterpart device 340. The first transmission mode may be the same operation mode as a default mode set in the electronic device 310 before and after the call channel is established with the counterpart device 340 or when the call channel is established with the counterpart device 340.

The second transmission mode may be executed when there is no voice of the user to be transmitted to the counterpart device 340 in the state where the call channel is established with the counterpart device 340. In other words, the second transmission mode may be a mode for transmitting data including silence without a transmission voice of the user to the counterpart device 340. The second transmission mode may be a mode for receiving data including an audio (e.g., a reception voice) of the counterpart device 340 without a transmission voice of the user.

The electronic device 310 may set at least any one of a transmit power and a peak current upon a wireless communication (RF) operation (e.g., a call) to be lower in the second transmission mode than in the first transmission mode. The transmit power and the peak current in the first transmission mode and the second transmission mode may be selectively adjusted to suit a situation of the user who wears the audio device 320.

As such, as the electronic device 310 is able to reduce the transmit power and the peak current in the second transmission mode, magnetic field noise radiated from the electronic device 310 may be reduced in the second transmission mode. Thus, as it is able reduce interference of a hearing-aid frequency of the audio device (e.g., hearing aids) due to the magnetic field noise, an improved audio signal may be provided to the user.

Figure 4:
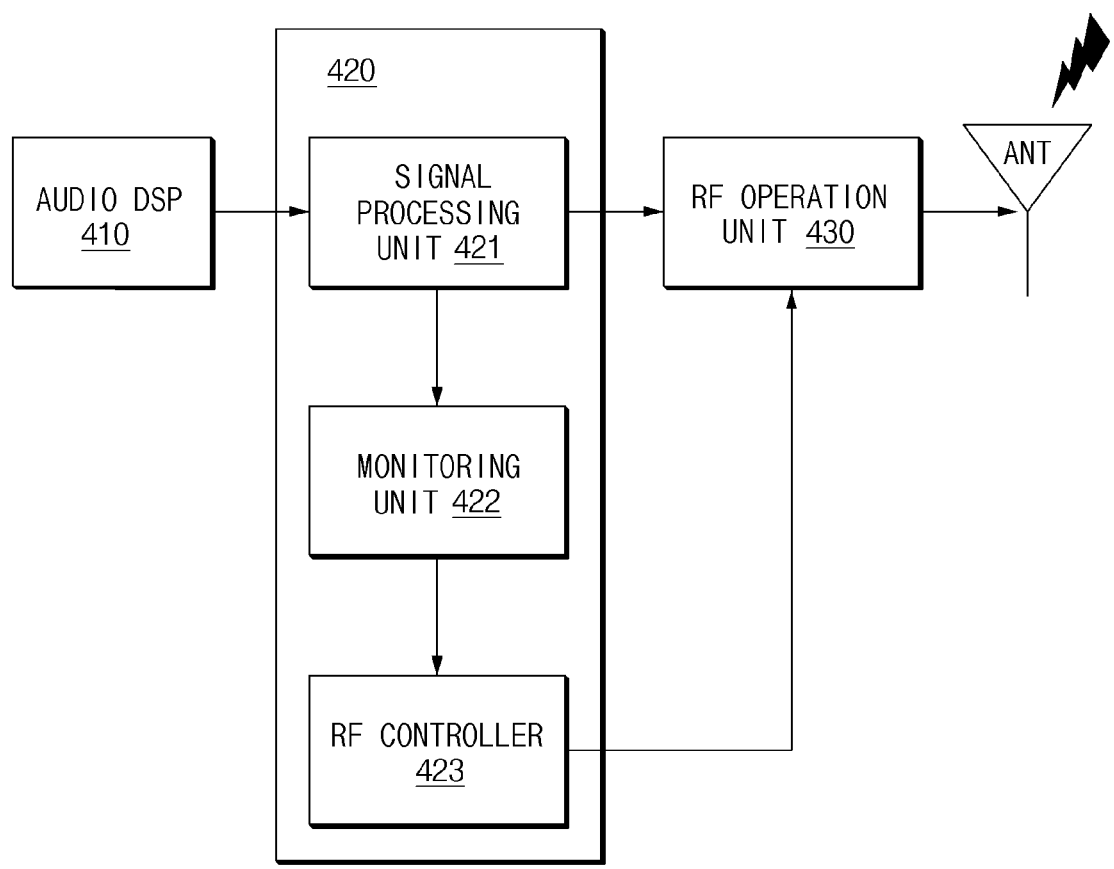
FIG. 4 is a block diagram illustrating an example configuration of an electronic device according to various embodiments.

FIG. 4 is a block diagram illustrating an example configuration of an electronic device according to various embodiments.

Referring to FIG. 4, the electronic device according to an embodiment may include an audio digital signal processor (DSP) (e.g., including signal processing circuitry) 410, a communication processor (CP) (e.g., including processing circuitry) 420, and a radio frequency (RF) operation unit 430. According to an embodiment, the audio DSP 410, the CP 420, and the RF operation unit (e.g., including RF circuitry) 430 may form at least a part of a wireless communication module (e.g., a wireless communication module of FIG. 2). According to an embodiment, the audio DSP 410 and the CP 420 may form at least a part of an auxiliary processor (e.g., an auxiliary processor 123 of FIG. 1), and the RF operation unit 430 may form at least a part of an antenna module (e.g., an antenna module 197 of FIG. 1).

Some or all of the blocks shown in FIG. 4 may be implemented as hardware and/or software configurations which execute a specific function. Functions performed by the blocks shown in FIG. 4 may be implemented by at least one microprocessor or may be implemented by circuit configurations for the corresponding function. Some or all of the blocks shown in FIG. 4 may be a software module configured with various programming languages or script languages executed by a processor (e.g., a processor 120 of FIG. 1).

The audio DSP 410 may include various signal processing circuitry and periodically receive an audio signal input through a microphone of the electronic device. For example, the audio DSP 410 may receive an audio signal in a period of 20 ms. The audio DSP 410 may receive an audio signal in units of frames of a predetermined period and may sequentially store the received frames to suit an order where they are generated (or an order where they are input to a microphone).

The audio DSP 410 may recognize whether there is an utterance of a user who wears an audio device (e.g., an audio device 320 of FIG. 3) based on the received audio signal. For example, the audio DSP 410 may recognize whether there is an utterance of the user based on an audio signal (e.g., a voice signal) of a specified magnitude or more, in a specified band (e.g., a human vocal range).

The audio DSP 410 may divide each frame into a voice frame and a silent frame based on whether there is a voice (or a transmission voice) according to the utterance of the user (e.g., the user of the audio device). The audio DSP 410 may classify a frame including a voice (or a transmission voice) according to the utterance of the user as a voice frame. The audio DSP 410 may classify a frame which does not include a voice according to the utterance of the user as a silent frame. The audio DSP 410 may determine whether there is a voice of the user using a speech activity detection (SAD) (or voice activity detection (VAD)) technology based on a normal distribution for intensity of an audio signal input through a microphone.

The audio DSP 410 may include artificial comfort noise generated in a comfort noise generation (CNG) scheme in the silent frame. The comfort noise may have voice intensity lower than a voice of the user. The comfort noise may be background noise inserted to make it feel natural without feeling disconnected between voice frames although it is a silent frame where there is no voice of the user.

The audio DSP 410 may load and transmit a plurality of frames into one packet. The audio DSP 410 may load and transmit a maximum of 7 to 20 consecutive silent frames into a silence insertion descriptor (SID) packet. An interval where only a plurality of silent frames are consecutively transmitted may be referred to as a silent interval or a discontinuous transmission (DTX) interval. For example, because the audio DSP 410 groups and transmits 8 consecutive silent frames in the SID packet, an SID packet may be transmitted in a period of 160 ms in the DTX interval.

The audio DSP 410 may load and transmit a plurality of consecutive frames into a speech packet. An interval where only a plurality of voice frames are consecutively transmitted may be referred to as a voice interval. For example, because the audio DSP 410 groups and transmits 10 consecutive voice frames in the speech packet, the speech packet may be transmitted in a period of 200 ms in the voice interval.

According to an embodiment, the CP 420 may include a signal processing unit 421, a monitoring unit 422, and an RF controller 423. Each of the units may include various processing circuitry and/or executable program instructions.

The signal processing unit 421 may perform signal processing such that the voice frame and the silent frame are output through the RF operation unit 430. For example, the signal processing unit 421 may perform signal processing (e.g., filter application or signal amplification) for data of the input voice frame and silent frame.

The monitoring unit 422 may monitor the voice frame and the silent frame input to the signal processing unit 421.

The monitoring unit 422 may monitor a duration of the DTX interval where the plurality of silent frames are consecutive or may monitor the number of times of consecutive repetition (or the number of times of consecutiveness or the number of times of repetition) of the DTX interval. After a last voice frame of the voice interval, the monitoring unit 422 may monitor (or count) whether the number of times of consecutive repetition of the DTX interval is greater than or equal to a predetermined first number of times. For example, when the silent frame includes a voice to which an AMR codec is applied, the monitoring unit 422 may monitor whether the DTX interval is greater than or equal to 3 to 4 times. When the silent frame includes a voice to which an EVS codec is applied, the monitoring unit 422 may monitor whether the DTX interval is greater than or equal to 1 to 2 times.

The monitoring unit 422 may monitor a duration of a voice interval where the plurality of voice frames are consecutive or may monitor the number of times of consecutive repetition of the plurality of voice frames. For example, after the DTX interval, the monitoring unit 422 may monitor (or count) whether the number of times of consecutive repetition of the voice frame is a predetermined second number of times (e.g., 10 times). The second number of times may be greater than the first number of times.

The RF controller 423 may include various RF control/processing circuitry and control the RF operation unit 430 to operate in any one of a first transmission mode (or a call transmission mode) and a second transmission mode (or a call reception mode) during a call between the electronic device and a counterpart device, based on the monitored result of the monitoring unit 422.

The first transmission mode may include a mode for transmitting data including a transmission voice of the user to the counterpart device. The second transmission mode may include a mode for transmitting data including silence without a transmission voice of the user to the counterpart device and receiving data including a reception voice of the counterpart device. According to an embodiment, the second transmission mode may be a mode capable of maintaining magnetic field noise radiated from the electronic device during the DTX interval to be less than or equal to a predefined reference value. The second transmission mode may be a mode capable of radiating less magnetic field noise radiated from the electronic device than the first transmission mode.

The RF controller 423 may include various circuitry and generate a mode switching signal and a mode restoration signal capable of controlling the RF operation unit 430. The mode switching signal may be a signal for switching an operation of the RF operation unit 430 from the first transmission mode for setting an initial operation mode of the electronic device in advance to the second transmission mode. The mode restoration signal may be a signal for restoring an operation of the RF operation unit 430 from the second transmission mode to the first transmission mode.

The RF controller 423 may transmit a control signal (or the mode switching signal and the mode restoration signal) for determining a transmit power and a peak current of the RF signal affecting a magnetic field induced from the electronic device to the audio device to the RF operation unit 430.

After a last voice frame of the voice interval, when the number of times of the consecutive repetition of the DTX interval is greater than or equal to the predetermined first number of times, the RF controller 423 may transmit the mode switching signal to the RF operation unit 430. After the DTX interval, when the number of times of the consecutive repetition of the voice frame is greater than or equal to the predetermined second number of times, the RF controller 423 may transmit the mode restoration signal to the RF operation unit 430.

According to an embodiment, the RF controller 423 may be configured to determine intensity of a transmit power of the RF signal input to an antenna ANT, based on the monitored result of the monitoring unit 422. The RF controller 423 may control the RF operation unit 430 to transmit an RF signal with a first transmit power in response to the mode restoration signal. The RF controller 423 may control the RF operation unit 430 to transmit an RF signal with a second transmit power lower than the first transmit power in response to the mode switching signal.

According to an embodiment, the RF controller 423 may be configured to determine intensity of a peak current of the RF signal input to the antenna ANT, based on the monitored result of the monitoring unit 422. The RF controller 423 may control the RF operation unit 430 to transmit an RF signal of a first peak current in response to the mode restoration signal. The RF controller 423 may control the RF operation unit 430 to transmit an RF signal of a second peak current lower than the first peak current in response to the mode switching signal.

The RF operation unit 430 may include various circuitry and transmit voice data of a voice frame and a silent frame as an RF signal. The RF operation unit 430 may switch and operate from the first transmission mode (or the call transmission mode) when establishing a call connection to the second transmission mode (or the call reception mode) in response to the mode switching signal from the RF controller 423. The RF operation unit 430 may be restored (or recovered) from the second transmission mode to the first transmission mode to operate in response to the mode restoration signal from the RF controller 423.

According to an embodiment, the RF operation unit 430 may operate in the first transmission mode for transmitting an RF signal with the first transmit power in response to the mode restoration signal. The RF operation unit 430 may maintain the predetermined first transmit power without reducing a transmit power, in the first transmission mode where there is a transmission voice of the user during a call. The RF operation unit 430 may transmit a plurality of voice frames with the first transmit power.

The RF operation unit 430 may operate in the second transmission mode for transmitting an RF signal with the second transmit power lower than the first transmit power in response to the mode switching signal. The RF operation unit 430 may decrease the transmit power to the second transmit power lower than the first transmit power, in the second transmission mode where there is no transmission voice of the user during a call. The RF operation unit 430 may transmit an SID packet including a plurality of silent frames with the second transmit power. The RF operation unit 430 may apply backoff to the transmit power to decrease the transmit power to the second transmit power. The RF operation unit 430 may apply backoff such that the second transmit power is adjusted in response to an RF radiation electric field condition. For example, when the first transmit power is a weak electric field of less than 100 dBm, the RF operation unit 430 may more downwardly adjust the second transmit power by 3 dB than the first transmit power. When the first transmit power is a medium and strong electric field of greater than or equal to 100 dBm, the RF operation unit 430 may more downwardly adjust the second transmit power by 6 dB than the first transmit power.

According to an embodiment, the RF operation unit 430 may operate in the first transmission mode for transmitting the RF signal of the first peak current in response to the mode restoration signal. The RF operation unit 430 may supply a predetermined first RF peak current to the antenna without reducing the RF peak current, in the first transmission mode where there is a transmission voice of the user during a call.

The RF operation unit 430 may operate in the second transmission mode for transmitting the RF signal of the second transmit power lower than the first transmit power in response to the mode switching signal. The RF operation unit 430 may supply a second RF peak current lower than the first RF peak current, in the second transmission mode where there is no transmission voice of the user during a call. The RF operation unit 430 may apply backoff to the RF peak current to decrease the RF peak current to the second peak current.

According to an embodiment, the electronic device may change an RF operation setting to be different from the first transmission mode, in the second transmission mode where there is no transmission voice of the user to be transmitted to a counterpart device. As an example, in the second transmission mode, backoff may be applied to a transmit power of an RF signal capable of acting as noise in the audio device. The transmit power of the RF signal may be more reduced in the second transmission mode than in the first transmission mode where there is a transmission voice of the user to be transmitted to the counterpart device. As another example, in the second transmission mode, a peak current (or an RF operating current) (or current consumption) when the RF is transmitted may be reduced. The peak current of the RF signal may be more reduced in the second transmission mode than in the first transmission mode. Thus, in the second transmission mode, an area where magnetic field noise (ABM2) is generated in the electronic device may be reduced. In the second transmission mode, because the amount of the magnetic field noise (ABM2) which is generated by the electronic device and is induced to the audio device is reduced, the user may experience improved audio performance.

Figure 5:
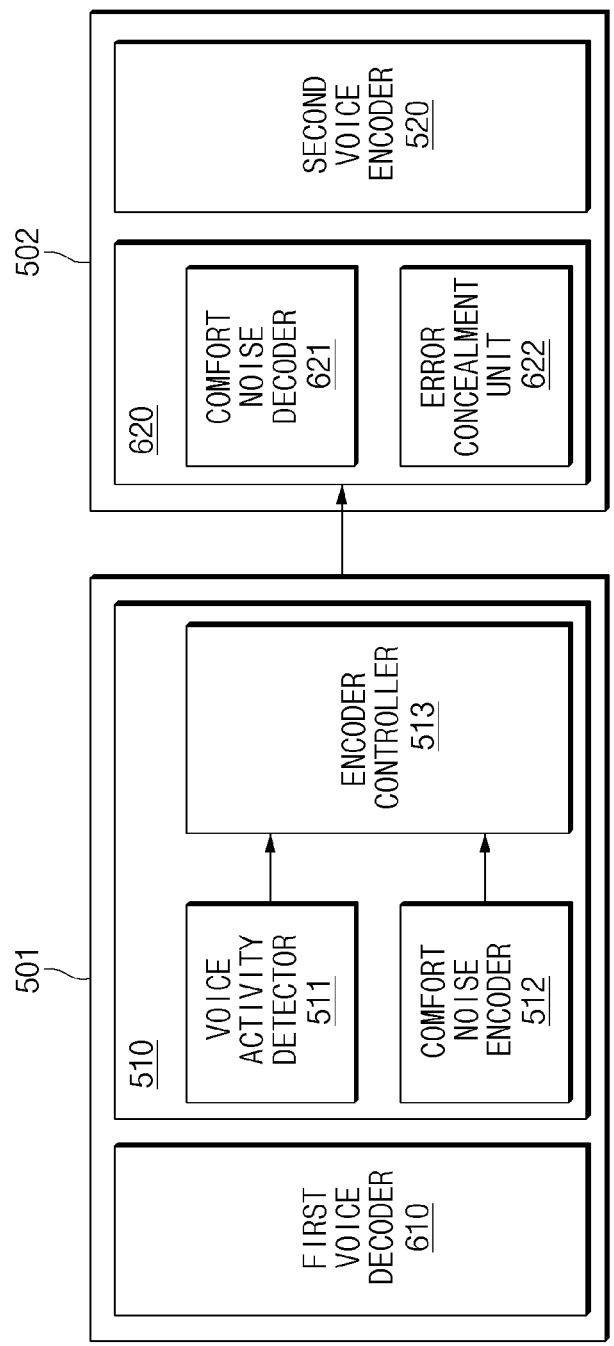
FIG. 5 is block diagram illustrating example transmission and reception of a voice signal between an electronic device and a counterpart device according to various embodiments.

FIG. 5 is block diagram illustrating example transmission and reception of a voice signal between an electronic device and a counterpart device according to various embodiments.

Referring to FIG. 5, an electronic device 501 (e.g., an electronic device 310 of FIG. 3) of a user who wears an audio device (e.g., an audio device 320 of FIG. 3) may establish a connection for a voice call with a counterpart device 502 (e.g., a counterpart device 340 of FIG. 3). The electronic device 501 and the counterpart device 502 may compress or decode a voice signal using a codec. The electronic device 501 and the counterpart device 502 may support various voice codecs. An example of the voice codec may be, but is not limited to, adaptive multi-rate (AMR), AMR-narrowband (AMR-NB), AMR-wideband (AMR-WB), enhanced voice services (EVS), an enhanced variable rate codec (EVRC), or the like. An example of a signal band supported by the EVS codec may be NB (20~4,000 Hz), WB (20~8,000 Hz), SWB (20~16,000 Hz), and FB (20~20,000 Hz).

A voice codex may be determined by at least one of a voice signal, an input of the user, and a network signal input to the electronic device 501 and the counterpart device 502. Each of the electronic device 501 and the counterpart device 502 may compress a voice signal to be transmitted and may restore the received voice signal, based on at least any one of a bit-rate and a bandwidth of the determined codec.

According to an embodiment, the electronic device 501 may include a first voice encoder 510 and a first voice decoder 610. The counterpart device 502 may include a second voice encoder 520 and a second voice decoder 620. Each of the voice encoder 510 and the second voice encoder 520 may compress a transmission voice signal. Each of the first voice decoder 610 and the second voice decoder 620 may decode the compressed reception voice signal. At least a part of the first voice decoder 610 of the electronic device 501 may include the same or similar configuration to the second voice decoder 620 of the counterpart device 502 and may use the same or similar function to the second voice decoder 620 of the counterpart device 502. At least a part of the second voice encoder 520 of the counterpart device 502 may include the same or similar configuration to the first voice decoder 610 of the electronic device 501 and may use the same or similar function to the first voice decoder 610 of the electronic device 501. Each of the electronic device 501 and the counterpart device 502 may be a transmission and reception terminal. However, hereinafter, the case where the electronic device 501 transmits a user voice of the electronic device 501 to the counterpart device 502 and an audio device (e.g., an audio device 320 of FIG. 3) and the counterpart device 502 receives the user voice will be described as an example.

According to an embodiment, the first voice encoder 510 of the electronic device 501 may perform encoding of a voice signal of the user to compress the voice signal input through a microphone of the electronic device 501. The first voice encoder 510 may include a voice activity detector (VAD) (e.g., including circuitry and/or executable program instructions) 511, a comfort noise encoder 512, and an encoder controller (e.g., including various processing/control circuitry) 513.

The VAD 511 may include various circuitry and/or executable program instructions and detect whether there is an utterance of the user of the electronic device 501 based on the audio signal received through the microphone of the electronic device 501, during a call. The VAD 511 may distinguish an utterance of a wearer from an utterance of an outsider (e.g., a person who is not the wearer).

The comfort noise encoder 512 may encode artificial comfort noise generated in a comfort noise generation (CNG) scheme. The comfort noise may have voice intensity lower than a voice of the user.

The encoder controller 513 may include various circuitry transmit a silent frame and a voice frame including a voice of the user to the counterpart device 502. Comfort noise may be inserted into a plurality of silent frames which are consecutively transmitted in a DTX interval. Thus, even the silent frame where the voice of the user is not received through the microphone during a call may make it feel natural without being disconnected between voice frames.

According to an embodiment, the second voice decoder 620 of the counterpart device 502 may perform encoding of the received voice of the user. The second voice decoder 620 may include a comfort noise decoder 621 and an error concealment unit (e.g., including various circuitry and/or executable program instructions) 622.

The comfort noise decoder 621 may receive comfort noise of the silent frame and may perform decoding of the comfort noise. In addition, the second voice decoder 620 may receive a user voice of the voice frame and may perform decoding of the user voice.

The error concealment unit 622 may include various circuitry and/or executable program instructions and restore a frame which is lost or distorted due to an error on transmission in a process of transmitting the silent frame and the voice frame over a wireless network in an error concealment method. The error concealment method may be a muting method, a repetition method, or an interpolation. The muting method may decrease a magnitude of a sound in a frame where an error occurs to dampen the influence of the error on an output signal. The repetition method may repeatedly play a previous good frame of the frame where the error occurs to restore a signal of the frame where the error occurs. The interpolation may interpolate parameters of the previous good frame and a next good frame to predict a parameter of an error frame. In an embodiment, the silent frame and the voice frame may be restored in the error concealment method. Although a silent frame is transmitted by at least any one of a transmit power and a peak current of an RF signal in the second transmission mode, it may be restored to an original state in the error concealment method.

Some or all of the blocks shown in FIG. 5 may be implemented as hardware and/or software configurations which execute a specific function. Functions performed by the blocks shown in FIG. 5 may be implemented by at least one microprocessor or may be implemented by circuit configurations for the corresponding function. Some or all of the blocks shown in FIG. 5 may be a software module configured with various programming languages or script languages executed by a processor (e.g., a processor 120 of FIG. 1).

Figure 6A:
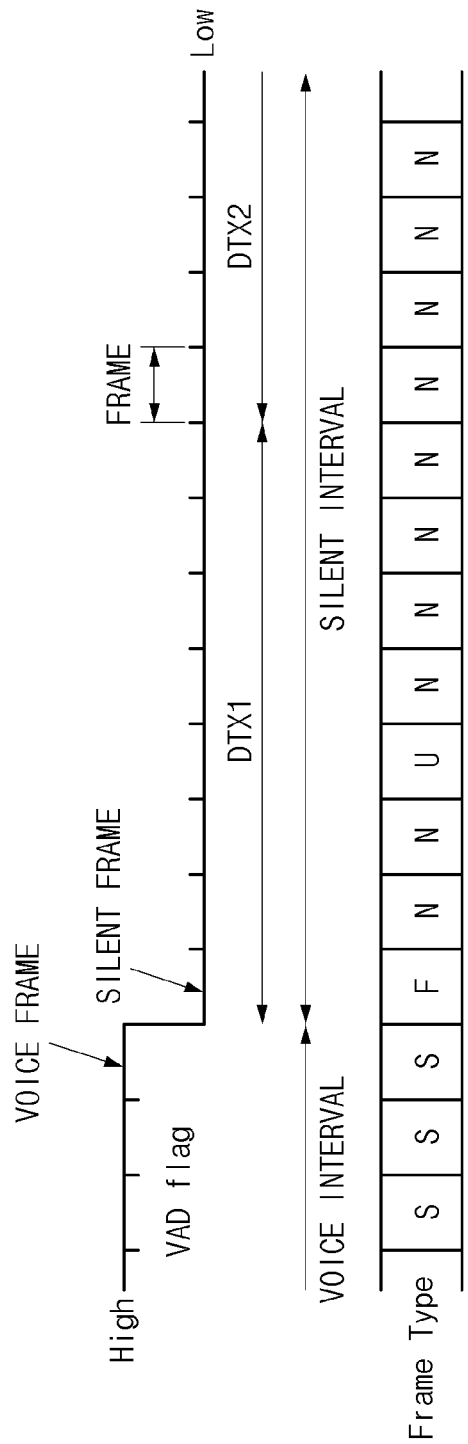
FIGS. 6A and 6B are diagrams illustrating identification information of each frame of an electronic device according to various embodiments.
Figure 6B:
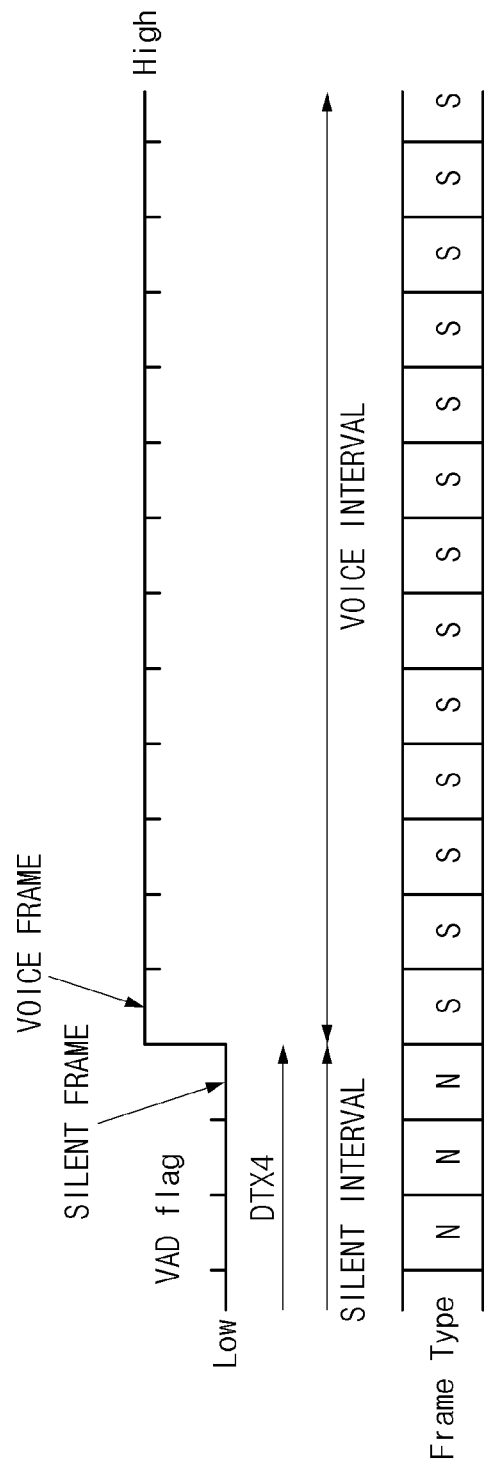

FIGS. 6A and 6B are diagrams illustrating example identification information of each frame of an electronic device according to various embodiments. In FIGS. 6A and 6B, a VAD flag may be a flag indicating whether a voice of a user is detected during a call. The VAD flag may refer to a voice when it is high logic (or 1) and may refer to silence when it is low logic (or 0).

Referring to FIGS. 6A and 6B, an electronic device may generate and transmit type information about a state of a frame for each frame.

A frame where the frame type information is marked with "S" may be SPEECH_GOOD, which may refer to a voice frame including a voice of the user. A frame marked with "F" may be "a first silent frame (SID FIRST or primary SID)", which may refer to a silent frame indicating a silent frame which does not include the voice of the user is first indicated. A frame marked with "N" may be "silent-NO DATA", which may refer to a silent frame indicated consecutively after the first silent frame. A frame marked with "U" may be "SID Update", which may refer to an mth (where m is a natural number greater than 1) (e.g., third) silent frame and a silent frame indicated per nth (where n is a natural number greater than m) (e.g., eighth) after the mth silent frame. The flag and the frame type information are not limited to the embodiment described in FIGS. 6A and 6B, which may vary with a manner defined by the user. Meanwhile, the frame type information may be only a conceptual name for describing an encoding mechanism and may fail to be transmitted to a counterpart device. Only the encoded voice frame and the encoded silent frame may be actually transmitted to the counterpart device.

According to an embodiment, a hangover interval may be formed between the voice interval and the silent interval. The hangover interval may include a plurality of silent frames after a last voice frame of the voice interval. The hangover interval may refer to an interval for waiting until the voice encoder is deactivated during a certain period of time after the first silent frame of the silent interval. When a plurality of silent frames (e.g., 8 silent frames) or more continue, it may be determined that it switches from the voice interval to the silent interval.

According to an embodiment, when the silent frame continues during a predetermined first period of time (e.g., 480 ms) or more after the last voice frame of the voice interval, the electronic device may switch from a first transmission mode to a second transmission mode. When a DTX interval including the plurality of silent frames (e.g., 8 silent frames) continues a plurality of times (3 times) or more after the voice interval, the electronic device may determine that there is no voice of the user to be transmitted to the counterpart device and may operate in the second transmission mode.

According to an embodiment, when the voice frame continues during a predetermined second period of time (e.g., 200 ms) after the last silent frame of the silent interval, the electronic device may switch from the second transmission mode to the first transmission mode. After the DTX interval, when the voice frame continues a plurality of times (10 times) or more, the electronic device may determine that there is a voice of the user to be transmitted to the counterpart device and may operate in the first transmission mode. Meanwhile, the second period of time may be a period of time shorter than the first period of time.

Figure 7A:
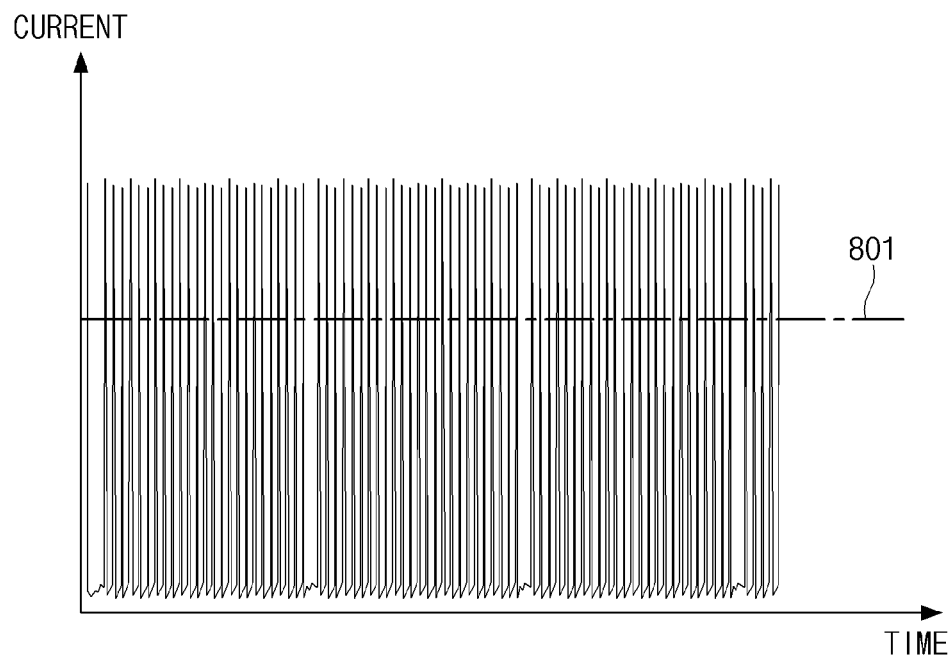
FIGS. 7A and 7B are graphs illustrating a peak current according to an operation mode of an electronic device according to various embodiments.
Figure 7B:
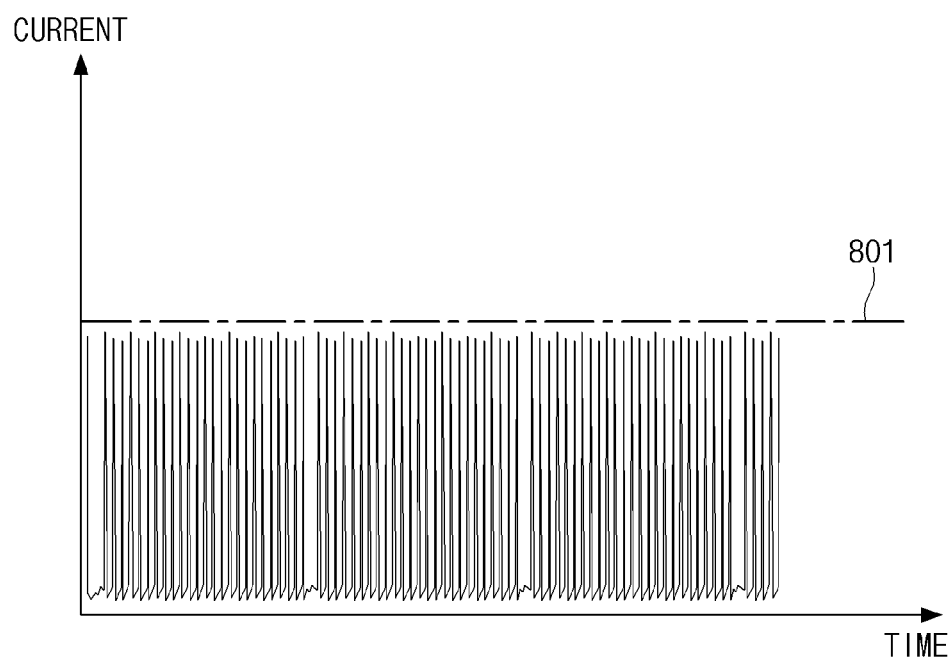

FIGS. 7A and 7B are graphs illustrating a peak current according to an operation mode of an electronic device according to various embodiments.

According to an embodiment, an electronic device (e.g., an electronic device 310 of FIG. 3) of a user who wears an audio device (e.g., an audio device 320 of FIG. 3) may select a tune code to have difference antenna impedance performance based on whether there is a voice of a user during a call. An RF operation unit (e.g., a communication circuit 313 or 314 of FIG. 3 or an RF operation unit 430 of FIG. 4) of the electronic device may include a tuner IC (not shown) connected with a matching terminal of an antenna. The tuner IC may adjust an impedance of the connected antenna based on the selected tune code.

When it is determined that there is the voice of the user to be transmitted to a counterpart device (e.g., a counterpart device 340 of FIG. 3) during a call, the electronic device may select a first tune code corresponding to a first transmission mode. The electronic device may select the first tune code corresponding to the first transmission mode in a voice interval. The electronic device may tune the antenna using the selected first tune code and may transmit an RF signal having a first peak current higher than an allowable current value 801 as shown in FIG. 7A.

When it is determined that there is no voice of the user to be transmitted to a counterpart during a call, the electronic device may select a second tune code corresponding to a second transmission mode. The electronic device may select the second tune code corresponding to the second transmission mode in a silent interval or a DTX interval. The electronic device may tune the antenna using the selected second tune code and may transmit an RF signal having a second peak current lower than the first peak current as shown in FIG. 7B. The second peak current value may be the same as the allowable current value 801 lower than the first peak current value and may be greater than the allowable current value 801 and may be lower than the first peak current value.

According to an embodiment, the first tune code may be a tune code more optimized for transmission performance than the second tune code. The second tune code may be a tune code tailored to reception performance, in a minimum allowance level of a transmit power.

Figure 8:
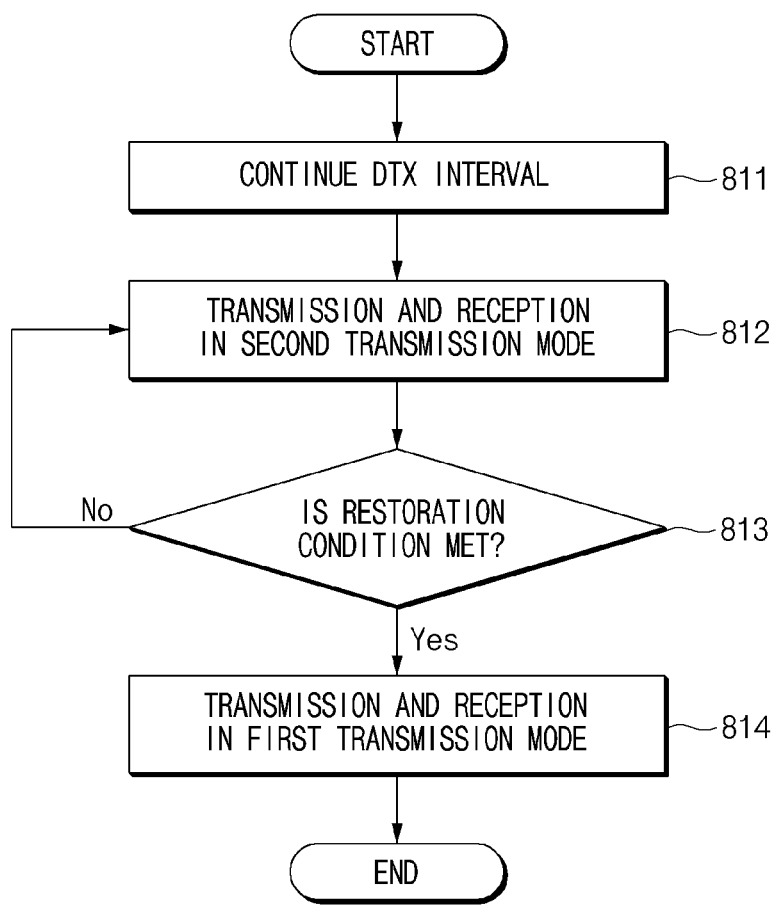
FIG. 8 is a flowchart illustrating an example method for determining an operation mode of an electronic device according to various embodiments.

FIG. 8 is a flowchart illustrating an example method for determining an operation mode of an electronic device according to various embodiments.

Referring to FIG. 8, in operation 811, an electronic device (e.g., an electronic device 310 of FIG. 3) of a user who wears an audio device (e.g., an audio device 320 of FIG. 3) may determine whether it enters a DTX interval and the a DTX interval continues, based on a duration (or the number of times of consecutive repetition) of a silent frame which does not include a voice of a user to be transmitted to a counterpart device (e.g., a counterpart device 340 of FIG. 3). After a last voice frame of a voice interval, when the duration (or the number of times of the consecutive repetition) of the silent frame is greater than or equal to a threshold, the electronic device may determine that it enters the DTX interval. The electronic device may determine whether the DTX interval continues based on the duration (or the number of times of the consecutive repetition) of the DTX interval.

In operation 812, when the DTX interval continues during a predefined certain time, the electronic device may maintain a communication connection with the counterpart device and the audio device in a second transmission mode (or a call reception mode) where there is no voice of the user to be transmitted to the counterpart device. The electronic device may transmit a silent frame which does not include a voice of the user to the counterpart device and the audio device. The electronic device may receive an audio signal of the counterpart device. The second transmission mode may be an operation mode tailored to reception performance, in an allowable level of transmission performance lower than a first transmission mode (or a call transmission mode).

In operation 813, the electronic device may determine whether the operation mode meets a restoration condition, based on a duration (or the number of times of consecutive repetition) of a voice frame including the voice of the user to be transmitted to the counterpart device. After a last silent frame included in a silent interval, when the duration (or the number of times of the consecutive repetition) of the voice frame is greater than or equal to the threshold, the electronic device may meet the restoration condition.

After the last silent frame include in the silent interval, when the duration (or the number of times of the consecutive repetition) of the voice frame is greater than or equal to (operation 813 (Yes)), in operation 814, the electronic device may restore the operation mode from the second transmission mode to the first transmission mode. The electronic device may maintain the communication connection with the counterpart device in the first transmission mode in which the transmission performance is optimized. The electronic device may transmit a voice frame including the voice of the user to the counterpart device in the first transmission mode.

After the last silent frame include in the silent interval, when the duration (or the number of times of the consecutive repetition) of the voice frame is less than the threshold (operation 813 (e.g., No)), the electronic device may maintain the communication connection with the counterpart device in the second transmission mode.

When transmitting a control signal (e.g., PUCCH) necessary to maintain a call to a base station, the electronic device may be restored from the second transmission mode to the first transmission mode.

Figure 9:
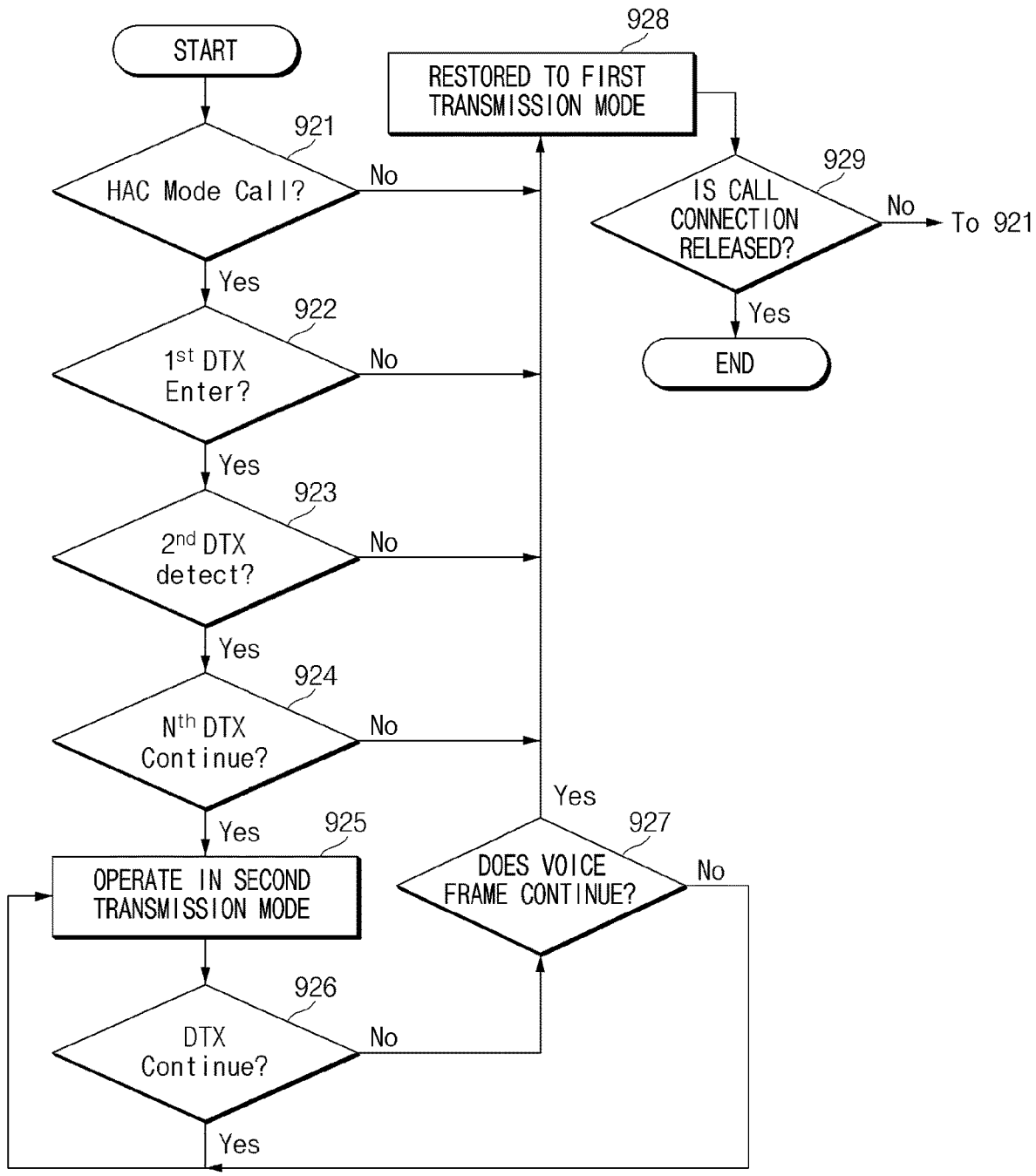
FIG. 9 is a flowchart illustrating an example method for controlling an operation mode of an electronic device according to various embodiments.

FIG. 9 is a flowchart illustrating an example method for controlling an operation mode of an electronic device according to various embodiments.

Referring to FIG. 9, in operation 921, an electronic device (e.g., an electronic device 310 of FIG. 3) of a user who wears an audio device (e.g., an audio device 320 of FIG. 3) may establish a call connection with a counterpart device (e.g., a counterpart device 340 of FIG. 3) using a communication module (e.g., a communication module 190 of FIG. 1). The electronic device may activate an HAC mode before or after establishing the call connection with the counterpart device. Meanwhile, in operation 921 (No), the electronic device may set an operation mode to a first transmission mode or may maintain the first transmission mode when communicating with at least any one of the audio device and the counterpart device in operation 928.

When the HAC mode is in an active state (operation 921 (Yes)), in operation 922, the electronic device (e.g., a CP 420 of FIG. 4) may determine whether it enters a DTX interval while maintaining the call connection with the counterpart device.

After a last voice frame of a voice interval, when a duration (or the number of times of consecutive repetition) of a silent frame is less than a threshold, the electronic device may determine that it does not enter the DTX interval for the first time. When not entering the DTX interval (operation 922 (No)), the electronic device may maintain the first transmission mode which is a current operation mode in operation 928.

After the last voice frame of the voice interval, when the duration (or the number of times of the consecutive repetition) of the silent frame is greater than or equal to the threshold, the electronic device may determine that it enters the DTX interval for the first time (operation 922 (Yes)).

In operation 923, the electronic device (e.g., the CP 420 of FIG. 4) may determine continuity of the DTX interval. For example, after entering the DTX for the first time, the electronic device may determine whether the DTX interval continues again. When the DTX interval does not continue (operation 923 (No)), the electronic device may maintain the first transmission mode which is the current operation mode in operation 928.

When the DTX interval continues (operation 923 (Yes)), in operation 924, the electronic device (e.g., the CP 420 of FIG. 4) may determine the number of times of consecutive repetition (or a duration) of the DTX interval. For example, the electronic device may determine whether the number of times of the consecutive repetition of the DTX interval arrives at a threshold (or N (where N is a natural number of 3 or more) times). The threshold of the number of times of the consecutive repetition may be set or changed by a user or a manufacturer. When the number of times of the consecutive repetition of the DTX interval is less than the threshold (operation 924 (No)), the electronic device may maintain the communication connection with the counterpart device in the first transmission mode which is the current operation mode in operation 928.

When the number of times of the consecutive repetition of the DTX interval arrives at the threshold (operation 924 (Yes)), in operation 925, the electronic device (e.g., an RF operation unit 420 of FIG. 4) may switch the operation mode to a second transmission mode. The electronic device may maintain the communication connection with the counterpart device in the second transmission mode in which there is no voice of the user to be transmitted to the counterpart device. The electronic device may transmit a silent frame which does not include the voice of the user to the counterpart device and may receive an audio signal of the counterpart device.

After switching to the second transmission mode, in operation 926, the electronic device (e.g., the CP 420 of FIG. 4) may determine whether the DTX interval continues. After switching to the second transmission mode, when the DTX interval continues (operation 926 (Yes)), the electronic device may maintain the communication connection with the counterpart device in the second transmission mode.

When the DTX interval does not continue (operation 926 (No)), in operation 927, the electronic device (e.g., the CP 420 of FIG. 4) may determine a duration (or the number of times of consecutive repetition) of a voice frame to determine whether the voice frame continues. After a last silent frame included in the DTX interval, when a plurality of voice frames do not continue (operation 927 (No)), the electronic device (e.g., the CP 420 of FIG. 4) may maintain the communication connection with the counterpart device in the second transmission mode.

After the last silent frame included in the DTX interval, when the plurality of voice frames continue (operation 927 (Yes)), in operation 928, the electronic device (e.g., the CP 420 of FIG. 4) may restore the operation mode from the second transmission mode to the first transmission mode. The electronic device may maintain the communication connection with the counterpart device in the first transmission mode. The electronic device may transmit a voice frame including the voice of the user to the counterpart device in the first transmission mode.

In operation 929, the electronic device may identify whether the call connection is released. When the call connection is released, the electronic device may return to the state before the call connection. When the call connection is released in the first transmission mode, the electronic device may maintain the first transmission mode. When the call connection is released in the second transmission mode, the electronic device may be restored to the first transmission mode.

Figure 10:
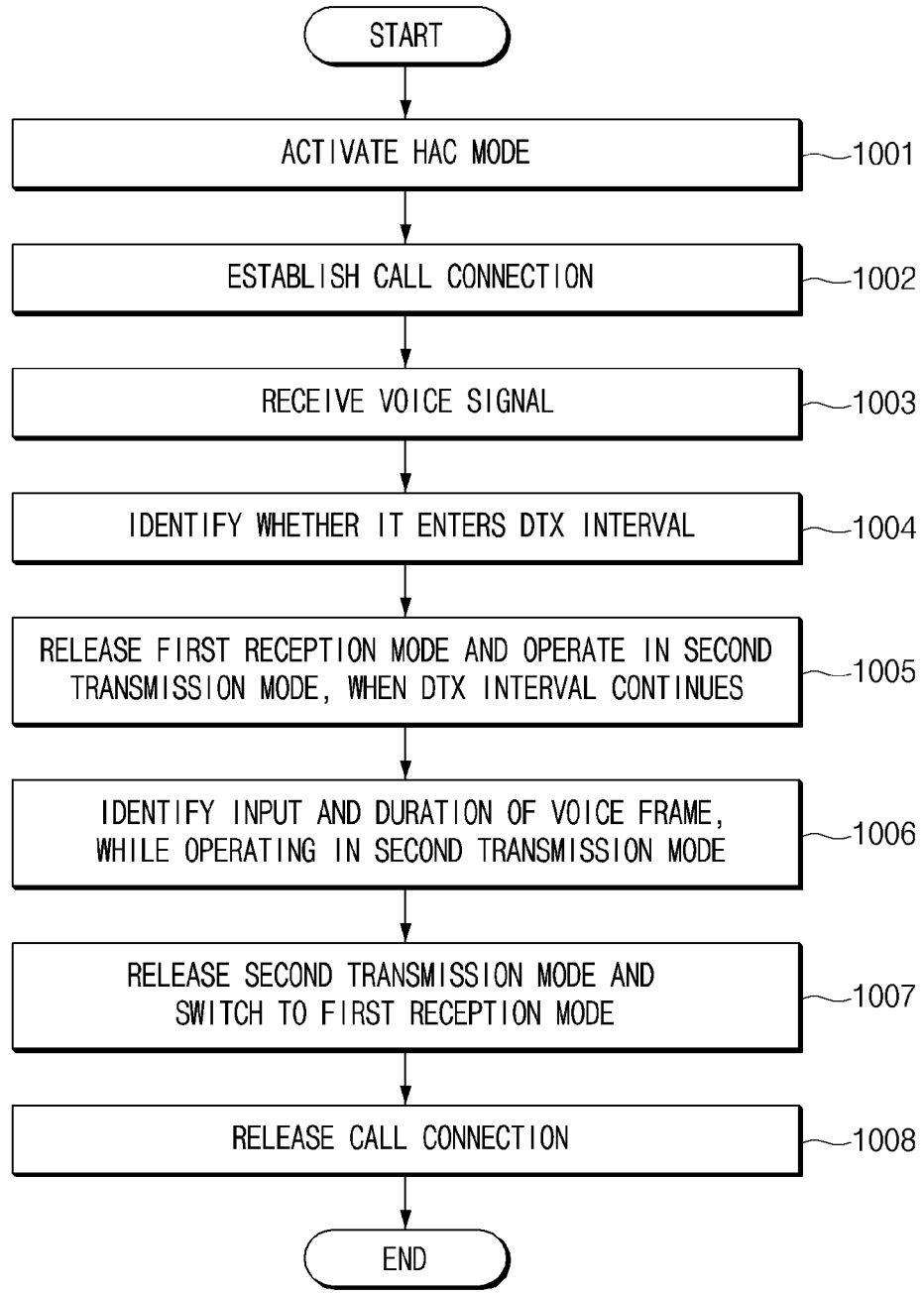
FIG. 10 is a flowchart illustrating example method of operating an electronic device according to various embodiments.

FIG. 10 is a flowchart illustrating an example method of operating an electronic device according to various embodiments.

Referring to FIG. 10, in operation 1001, an electronic device (e.g., an electronic device 310 of FIG. 3) of a user who wears an audio device (e.g., an audio device 320 of FIG. 3) may activate an HAC mode. As an example, when an item for activating the HAC mode in a setting menu of the electronic device is selected, the electronic device may activate the HAC mode. As another example, when a predetermined gesture is detected, the electronic device may activate the HAC mode. As another example, when the electronic device is disposed close to the audio device, it may activate the HAC mode. As another example, when a communication connection between the electronic device and the counterpart device is established, the electronic device may activate the HAC mode.

The electronic device in which the HAC mode is activated may form a communication channel with the audio device through a communication module (e.g., a communication module 190 of FIG. 1 or a second communication circuit 314 of FIG. 3). When activating the HAC mode and forming the communication channel with the audio device, the electronic device may operate in a first transmission mode.

According to an embodiment, the electronic device may be configured to activate the HAC mode during a certain time and then deactivate the HAC mode. For example, when the call connection with the counterpart device is released, the electronic device may be configured to deactivate the HAC mode.

In operation 1002, the electronic device may generate a request for at least any one of call reception and call transmission through the communication module (e.g., the communication module 190 of FIG. 1 or a first communication circuit 313 of FIG. 3). The electronic device may establish a call connection with a counterpart device (e.g., a counterpart device 340 of FIG. 3). Meanwhile, when communicating with at least any one of the audio device and the counterpart device, the electronic device may set an operation mode to the first transmission mode or may maintain the first transmission mode.

The case where the HAC mode of the electronic device is activated before the call connection is established with the counterpart device is described as an example in the description above, but the HAC mode may be activated after the call connection is established with the counterpart device.

In operation 1003, the electronic device (e.g., an audio DSP 410 of FIG. 4) may recognize whether there is an utterance of a user based on an audio signal input through a microphone. For example, the electronic device (e.g., the audio DSP 410 of FIG. 4) may recognize whether there is an utterance of the user based on an audio signal (e.g., a voice signal) of a specified magnitude or more in a specified band (e.g., a human vocal range). The electronic device (e.g., the audio DSP 410 of FIG. 4) may receive a voice of the user, which is included in the audio signal. The electronic device may divide each frame into a voice frame and a silent frame based on whether there is a voice according to the utterance of the user.

In operation 1004, the electronic device may determine whether it enters a DTX interval, based on continuity of a plurality of silent frames. When the number of the plurality of silent frames which are consecutive is greater than or equal to a threshold, the electronic device may determine that it enters the DTX interval. When the number of the plurality of silent frames which are consecutive is less than the threshold, the electronic device may determine that it does not enter the DTX interval.

After entering the DTX interval, in operation 1005, the electronic device may control an operation mode of the electronic device to operate in any one of the first transmission mode and a second transmission mode, based on the number of times of consecutive repetition of the DTX interval including the plurality of silent frames which are consecutive. After entering the DTX interval, when the DTX interval consecutively continues a plurality of times, the electronic device may be controlled to release the first transmission mode and switch to the second transmission mode.

After entering the DTX interval, when the DTX interval does not consecutively continue the plurality of times, in operation 1006, the electronic device may determine continuity of a plurality of voice frames.

When the number of the plurality of voice frames is greater than or equal to the threshold, in operation 1007, the electronic device may be controlled to release the second transmission mode and operate in the first transmission mode. When the number of the plurality of voice frames is less than the threshold, the electronic device may be controlled to maintain the second transmission mode.

In operation 1008, the electronic device may identify whether the call connection is released. When the call connection is released, the electronic device may return to the state before the call connection. When the call connection is released in the second transmission mode, the electronic device may be restored to the first transmission mode. When the call connection is released in the first transmission mode, the electronic device may maintain the first transmission mode.

The above-mentioned electronic device is not limited to the embodiments described in each drawing, and the embodiments described in each drawing may be applied in combination with each other.

As noise radiated from the electronic device is induced to an audio device (e.g., hearing aids) worn by the user, the quality of an audio transmitted to the user may be degraded.

Embodiments of the disclosure relate to an electronic device capable of providing hearing impaired users with improve call quality and a control method thereof.

The technical problems to be addressed by the disclosure are not limited to the aforementioned technical problems, and any other technical problems not mentioned herein will be clearly understood from the following description by those skilled in the art to which the disclosure pertains.

According to an example embodiment of the disclosure, an electronic device may include: a microphone, a communication module including a first communication circuit (e.g., a communication module 190 of FIG. 1 or a first communication circuit 313 of FIG. 3) configured to provide a call channel with a first external electronic device (e.g., an electronic device 102 or 104 of FIG. 1, a counterpart device 220 of FIG. 2, a counterpart device 320 of FIG. 3, or a counterpart device 502 of FIG. 5) and a second communication circuit (e.g., the communication module 190 of FIG. 1 or a second communication circuit 314 of FIG. 3) configured to provide a communication channel with a second external electronic device (e.g., an audio device 220 of FIG. 2 or an audio device 320 of FIG. 3), and a processor (e.g., a processor 120 of FIG. 1, a processor 311 of FIG. 3, or a processor 410 or 420 of FIG. 4) electrically connected with the communication module. The processor may be configured to: allow the electronic device operating in a first transmission mode and the first external electronic device to establish a call connection with each other through the first communication circuit, identify whether an utterance of a user wearing a the second external electronic device occurs while the call connection is maintained, and operate in a second transmission mode different from the first transmission mode, based on a voice signal of the user to be transmitted to the first external electronic device not being recognized, while the call connection is maintained, and operate in the first transmission mode, based on the voice signal of the user to be transmitted to the first external electronic device being recognized while the call connection is maintained.

According to an example embodiment, the processor may be configured to generate a plurality of voice frames including the voice signal of the user and a plurality of silent frames not including the voice signal of the user.

According to an example embodiment, at least any one of the plurality of silent frames may include comfort noise, the processor being configured to generate the comfort noise.

According to an example embodiment, the communication module may be configured to: transmit the plurality of voice frames to the first external electronic device in the first transmission mode and transmit the plurality of silent frames to the first external electronic device in the second transmission mode.

According to an example embodiment, the communication module may be configured to transmit the plurality of voice frames and the silent frames as a radio frequency (RF) signal. The communication module may be configured to backoff to adjust a transmit power of the RF signal when the electronic device operates in the second transmission mode.

According to an example embodiment, the communication module may be configured to transmit the plurality of voice frames and the silent frames as a radio frequency (RF) signal. The communication module may be configured to transmit the RF signal with a first transmit power, based on the electronic device operating in the first transmission mode, and may be configured to transmit the RF signal with a second transmit power lower than the first transmit power, based on the electronic device operating in the second transmission mode.

According to an example embodiment, the communication module may be configured to adjust the second transmit power such that the second transmit power is lower based on the first transmit power being in a medium electric field and a strong electric field greater than the first transmit power being in a weak electric field lower than the medium or strong electric field.

According to an example embodiment, the communication module may be configured to transmit the plurality of voice frames and the silent frames as a radio frequency (RF) signal. The communication module may be configured to transmit the RF signal of a first peak current, based on the electronic device operating in the first transmission mode, and may be configured to transmit the RF signal of a second peak current lower than the first peak current, based on the electronic device operating in the second transmission mode.

According to an example embodiment, the processor may be configured to monitor the number of times of consecutiveness of a discontinuous transmission interval in which the plurality of silent frames are consecutive, after a last voice frame of a voice interval including the plurality of voice frames, may be configured to maintain the first transmission mode, based on the number of times of the consecutiveness being less than a first threshold, and may be configured to switch from the first transmission mode to the second transmission mode, based on the number of times of the consecutiveness being greater than or equal to the first threshold.

According to an example embodiment, the processor may be configured to monitor the number of transmitted voice frames, after a last silent frame included in the discontinuous transmission interval, may be configured to maintain the second transmission mode, based on the number of the voice frames being less than a second threshold, and may be configured to restore the second transmission mode to the first transmission mode, based on the number of the voice frames being greater than or equal to the second threshold.

According to an example embodiment, the processor may be configured to monitor a duration of a discontinuous transmission interval in which the plurality of silent frames are consecutive, after a last voice frame of a voice interval including the plurality of voice frames, may be configured to maintain the first transmission mode, based on the duration of the discontinuous transmission interval being less than a first threshold period of time, and may be configured to switch from the first transmission mode to the second transmission mode, based on the duration of the discontinuous transmission interval being greater than or equal to the first threshold period of time.

According to an example embodiment, the processor may be configured to monitor a duration of a voice interval in which the plurality of voice frames are consecutive, after a last silent frame included in the discontinuous transmission interval, may be configured to maintain the second transmission mode, based on the duration of the voice interval being less than a second threshold period of time, and may be configured to restore the second transmission mode to the first transmission mode, based on the duration of the voice interval being greater than or equal to the second threshold period of time.

According to an example embodiment, the processor may be configured to recognize whether there is a voice signal of the user, the voice signal being received through the microphone, using a voice activity detection (VAD) scheme.

According to an example embodiment, the electronic device may further include a voice decoder configured to: encode a silent signal received from the first external electronic device and restore the encoded silent signal in an error concealment scheme.

According to an example embodiment, the electronic device may be configured to support a hearing aids compatibility (HAC) mode, wherein the second external electronic device may include hearing aids.

According to an example embodiment of the disclosure, a method of operating an electronic device may include: providing a communication channel with a first external electronic device (e.g., an electronic device 102 or 104 of FIG. 1, a counterpart device 220 of FIG. 2, a counterpart device 320 of FIG. 3, or a counterpart device 502 of FIG. 5) in a first transmission mode and providing a communication channel with a second external electronic device (e.g., an audio device 220 of FIG. 2 or an audio device 320 of FIG. 3), identifying whether there is an utterance of a user wearing the second external electronic device, while a call connection between the electronic device and the first external electronic device is maintained, operating in a second transmission mode different from the first transmission mode, based on a voice signal of the user to be transmitted to the first external electronic device not being recognized, while the call connection is maintained, and operating in a first transmission mode, based on the voice signal of the user to be transmitted to the first external electronic device being recognized, while the call connection is maintained.

According to an example embodiment, the method of operating the electronic device may further include: transmitting a plurality of voice frames including the voice signal of the user to the first external electronic device in the first transmission mode and transmitting a plurality of silent frames not including the voice signal of the user to the first external electronic device in the second transmission mode.

According to an example embodiment, the plurality of voice frames may be transmitted as an RF signal of a first transmit power, and the plurality of silent frames may be transmitted as the RF signal of a second transmit power lower than the first transmit power.

According to an example embodiment, the plurality of voice frames may be transmitted as an RF signal having a first peak current, and the plurality of silent frames may be transmitted as the RF signal of a second peak current lower than the first peak current.

According to an example embodiment, the method of operating the electronic device may further include: monitoring the number of times of consecutiveness of a discontinuous transmission interval in which the plurality of silent frames are consecutive, after a last voice frame of a voice interval including the plurality of voice frames, switching from the first transmission mode to the second transmission mode, based on the number of times of the consecutiveness being greater than or equal to a first threshold, monitoring the number of transmitted voice frames, after a last silent frame included in the discontinuous transmission interval, and restoring the second transmission mode to the first transmission mode, based on the number of the voice frames being greater than or equal to a second threshold.

According to an example embodiment of the disclosure, magnetic field noise (ABM2) radiated from the electronic device may be reduced in a silent interval in which there is no voice of the user to be transmitted to the counterpart device. An amount of magnetic field noise induced to an audio device (e.g., hearing aids) worn by the user may be reduced and the best audio signal may be provided to the user.

According to an example embodiment of the disclosure, although a printed circuit board (PCB) and a power (e.g., GND) line are not spaced away from a speaker, magnetic field noise (ABM2) radiated from the electronic device may be reduced. Thus, design freedom of the PCB and the line may be increased.

According to an example embodiment of the disclosure, backoff may not proceed in a voice interval in which there is a voice of the user to be transmitted to the counterpart device and may selectively proceed in a silent interval. Thus, performance degradation of an RF signal may be prevented and/or reduced.

The electronic device according to an embodiment disclosed in the disclosure may be applied to various types of electronic devices. The electronic devices may include, for example, a portable communication device (e.g., a smartphone), a computer device, a portable multimedia device, a portable medical device, a camera, a wearable device, a home appliance, or the like. The electronic device according to an embodiment of the disclosure is not limited to the above-mentioned devices.

The various embodiments of the disclosure and the terms used herein do not limit the technology described in the disclosure to specific forms, and should be construed to include various modifications, equivalents, and/or replacements of the embodiments. With regard to description of drawings, similar components may be marked by similar reference numerals. In the disclosure disclosed herein, the expressions "A or B", or "at least one of A or/and B", "A, B, or C", or "at least one of A, B, or/and C", and the like used herein may include any and all combinations of one or more of the associated listed items. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a microphone;
   a communication module including a first communication circuit configured to provide a call channel with a first external electronic device and a second communication circuit configured to provide a communication channel with a second external electronic device;

a processor electrically connected with the communication module, wherein the processor is configured to:

allow the electronic device operating in a first transmission mode and the first external electronic device to establish a call connection with each other through the first communication circuit, identify whether there is an utterance of a user wearing the second external electronic device, while the call connection is maintained, operate in a second transmission mode different from the first transmission mode, based on a voice signal of the user to be transmitted to the first external electronic device not being recognized, while the call connection is maintained, and operate in the first transmission mode, based on the voice signal of the user to be transmitted to the first external electronic device being recognized, while the call connection is maintained.

2. The electronic device of claim 1, wherein the processor is configured to generate a plurality of voice frames including the voice signal of the user and a plurality of silent frames not including the voice signal of the user.

3. The electronic device of claim 2, wherein at least any one of the plurality of silent frames includes a comfort noise, wherein the processor is configured to generate the comfort noise.

4. The electronic device of claim 2, wherein the communication module is configured to: transmit the plurality of voice frames to the first external electronic device in the first transmission mode and transmit the plurality of silent frames to the first external electronic device in the second transmission mode.

5. The electronic device of claim 2, wherein the communication module is configured to transmit the plurality of voice frames and the silent frames as a radio frequency (RF) signal, and wherein the communication module is configured to back-off to adjust a transmit power of the RF signal, based on the electronic device operating in the second transmission mode.

6. The electronic device of claim 2, wherein the communication module is configured to transmit the plurality of voice frames and the silent frames as a radio frequency (RF) signal, and wherein the communication module is configured to: transmit the RF signal with a first transmit power, based on the electronic device operating in the first transmission mode, and transmit the RF signal with a second transmit power lower than the first transmit power, based on the electronic device operating in the second transmission mode.

7. The electronic device of claim 6, wherein the communication module is configured to adjust the second transmit power to be lower based on the first transmit power being in a medium electric field and a strong electric field than the first transmit power being in a weak electric field lower than the medium electric field and the strong electric field.

8. The electronic device of claim 2, wherein the communication module is configured to transmit the plurality of voice frames and the silent frames as a radio frequency (RF) signal, and wherein the communication module is configured to: transmit the RF signal of a first peak current, based on the electronic device operating in the first transmission mode, and transmit the RF signal of a second peak current lower than the first peak current, based on the electronic device operating in the second transmission mode.

9. The electronic device of claim 2, wherein the processor is configured to:

monitor a number of times of consecutiveness of a discontinuous transmission interval in which the plurality of silent frames are consecutive, after a last voice frame of a voice interval including the plurality of voice frames, maintain the first transmission mode, based on the number of times of the consecutiveness being less than a first threshold, and switch from the first transmission mode to the second transmission mode, based on the number of times of the consecutiveness being greater than or equal to the first threshold.

10. The electronic device of claim 9, wherein the processor is configured to:

monitor the number of transmitted voice frames, after a last silent frame included in the discontinuous transmission interval, maintain the second transmission mode, based on the number of the voice frames being less than a second threshold, and restore the second transmission mode to the first transmission mode, based on the number of the voice frames being greater than or equal to the second threshold.

11. The electronic device of claim 2, wherein the processor is configured to:

monitor a duration of a discontinuous transmission interval in which the plurality of silent frames are consecutive, after a last voice frame of a voice interval including the plurality of voice frames, maintain the first transmission mode, based on the duration of the discontinuous transmission interval being less than a first threshold period of time, and switch from the first transmission mode to the second transmission mode, based on the duration of the discontinuous transmission interval being greater than or equal to the first threshold period of time.

12. The electronic device of claim 11, wherein the processor is configured to:

monitor a duration of a voice interval in which the plurality of voice frames are consecutive, after a last silent frame included in the discontinuous transmission interval, maintain the second transmission mode, based on the duration of the voice interval being less than a second threshold period of time, and restore the second transmission mode to the first transmission mode, based on the duration of the voice interval being greater than or equal to the second threshold period of time.

13. The electronic device of claim 1, wherein the processor is configured to whether there is a voice signal of the user, the voice signal being received through the microphone, using a voice activity detection (VAD) scheme.

14. The electronic device of claim 1, further comprising:

a voice decoder configured to encode a silent signal received from the first external electronic device and restore the encoded silent signal in an error concealment scheme.

15. The electronic device of claim 1, wherein the electronic device is configured to support a hearing aids compatibility (HAC) mode, and wherein the second external electronic device includes hearing aids.

16. A method of operating an electronic device, the operating method comprising:
establishing a communication channel with a first external electronic device in a first transmission mode and establishing a communication channel with a second external electronic device;
identifying whether there is an utterance of a user wearing the second external electronic device, while a call connection between the electronic device and the first external electronic device is maintained;
operating in a second transmission mode different from the first transmission mode, based on a voice signal of the user to be transmitted to the first external electronic device not being recognized, while the call connection is maintained; and
operating in the first transmission mode, based on the voice signal of the user to be transmitted to the first external electronic device being recognized, while the call connection is maintained.

17. The method of claim 16, further comprising:
transmitting a plurality of voice frames including the voice signal of the user to the first external electronic device in the first transmission mode; and
transmitting a plurality of silent frames not including the voice signal of the user to the first external electronic device in the second transmission mode.

18. The method of claim 17, wherein the plurality of voice frames are transmitted as an RF signal of a first transmit power, and
wherein the plurality of silent frames are transmitted as the RF signal of a second transmit power lower than the first transmit power.

19. The method of claim 17, wherein the plurality of voice frames are transmitted as an RF signal having a first peak current, and
wherein the plurality of silent frames are transmitted as the RF signal of a second peak current lower than the first peak current.

20. The method of claim 17, further comprising:
monitoring a number of times of consecutiveness of a discontinuous transmission interval in which the plurality of silent frames are consecutive, after a last voice frame of a voice interval including the plurality of voice frames;
switching from the first transmission mode to the second transmission mode, based on the number of times of the consecutiveness being greater than or equal to a first threshold;
monitoring the number of transmitted voice frames, after a last silent frame included in the discontinuous transmission interval; and
restoring the second transmission mode to the first transmission mode, based on the number of the voice frames being greater than or equal to a second threshold.

* * * * *